(12) United States Patent
Mahapatra et al.

(10) Patent No.: US 10,257,026 B1
(45) Date of Patent: Apr. 9, 2019

(54) SYSTEM AND METHOD TO MANAGE INTERRELATED DEVICES IN A COMPUTING INFRASTRUCTURE

(71) Applicant: VCE Company, LLC, Richardson, TX (US)

(72) Inventors: Akshaya Mahapatra, San Jose, CA (US); Zunhe Jin, Sunnyvale, CA (US); Michael Tan, Palo Alto, CA (US); Sayajirao Patil, San Jose, CA (US)

(73) Assignee: VCE IP Holding Company LLC, Richardson, TX (US)

( * ) Notice: Subject to any disclaimer, the term of this patent is extended or adjusted under 35 U.S.C. 154(b) by 204 days.

(21) Appl. No.: 14/134,958

(22) Filed: Dec. 19, 2013

(51) Int. Cl.
*G06F 15/177* (2006.01)
*H04L 12/24* (2006.01)

(52) U.S. Cl.
CPC .............................. *H04L 41/0803* (2013.01)

(58) Field of Classification Search
CPC .................................................. H04L 41/0803
USPC .................................................. 709/203, 220
See application file for complete search history.

(56) References Cited

U.S. PATENT DOCUMENTS

| | | | | |
|---|---|---|---|---|
| 6,725,261 B1* | 4/2004 | Novaes | ................. | G06F 11/006 709/201 |
| 7,080,133 B1* | 7/2006 | Burton | ................... | H04L 41/08 709/221 |
| 9,317,269 B2* | 4/2016 | Kimmet | ..................... | G06F 8/61 |
| 2009/0158292 A1* | 6/2009 | Rattner | ................. | G06F 9/5005 718/106 |
| 2013/0232480 A1* | 9/2013 | Winterfeldt | ............... | G06F 8/60 717/177 |
| 2014/0129690 A1* | 5/2014 | Jaisinghani | ........... | G06F 9/5061 709/222 |

OTHER PUBLICATIONS

Emerson Network Power, "Liebert MPX User Manual"; Emerson Electric Co., 36 pages, 2009.
EMC², EMC Symmetrix Field Upgrade Instructions, EMC Corporation, 42 pages, Feb. 19, 2013.

* cited by examiner

*Primary Examiner* — Duyen M Doan
(74) *Attorney, Agent, or Firm* — Polsinelli PC

(57) ABSTRACT

A computing infrastructure management system includes a processing system and a memory for storing a configuration management client, which is executed by the processing system to receive a manifest file associated with a computing infrastructure comprising a plurality of computing devices each having one or more resources. Using the received manifest file, the client translates the manifest file by arranging one or more directives of the manifest file according to one or more dependencies of each resource relative to the resources of the other computing devices, and provisions the resources of each computing device using the translated manifest file.

16 Claims, 6 Drawing Sheets

SYSTEM AND METHOD TO MANAGE INTERRELATED DEVICES IN A COMPUTING INFRASTRUCTURE

TECHNICAL FIELD

Aspects of the present disclosure relate to computing devices and, in particular, to a system and method to manage interrelated devices in a computing infrastructure.

BACKGROUND

Computing resources used by enterprises, such as corporations and universities, are now often provided by data centers that utilize multiple computing devices that function in a collaborative manner to meet the computing resource needs of the enterprise. The computing devices for such data centers are configured in various process load sharing and/or redundant configurations to provide a level of availability and reliability required by these enterprises. Early data center designs were very complex and difficult to maintain due to various reasons. For example, a lack of standardized and consistent hardware and software typically meant that each data center had unique maintenance schedules and diagnostic procedures that were unique to each center. Also, the physical aspects for each data center implementation, such as inter-rack cabling, and environmental control systems had to be uniquely addressed. To remedy these problems, converged infrastructures were introduced that provided a standardized package of components into a single, optimized computing solution. Nevertheless, because the resource needs of each enterprise is often unique, customization of these converged infrastructures remains an area for advancement. Additionally, these custom configurations have been relatively difficult to maintain due to ever-changing upgrades required for each computing device of the converged infrastructure.

SUMMARY

According to one aspect of the present disclosure, a computing infrastructure management system includes a processing system and a memory for storing a configuration management client, which is executed by the processing system to receive a manifest file associated with a computing infrastructure comprising a plurality of computing devices each having one or more resources. Using the received manifest file, the client translates the manifest file by arranging one or more directives of the manifest file according to one or more dependencies of each resource relative to the resources of the other computing devices, and provisions the resources of each computing device using the translated manifest file.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope FIGS. 1A through 10 illustrate an example computing infrastructure management system according to the teachings of the present disclosure.

FIG. 2 is a block diagram depicting an example configuration management client executed on the management proxy according to the teachings of the present disclosure.

FIG. 3 illustrates an example computing infrastructure that may be provisioned by a computing infrastructure management system according to the teachings of the present disclosure.

FIG. 4 illustrates an example process that is performed by the configuration management system to manage configuration of one or more computing infrastructures according to the teachings of the present disclosure.

FIG. 5 is a block diagram illustrating an example of a computing device or computer system which may be used in implementing the embodiments of the present disclosure.

DETAILED DESCRIPTION

Figure 1A:
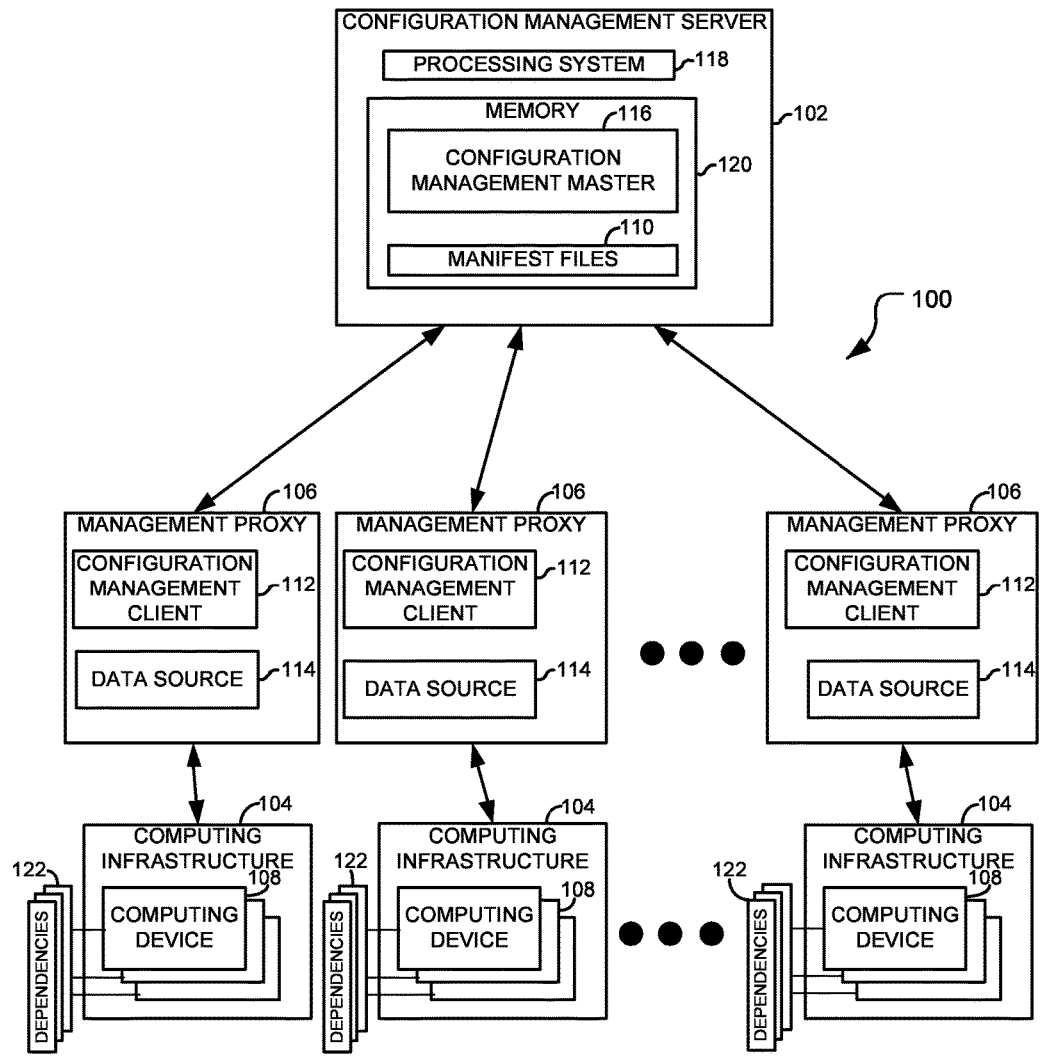

Aspects of a computing infrastructure management system described herein provide configuration management of computing infrastructures, such as computer clusters, computing grids, and other computing infrastructures, using a management system that configures each computing device of the computing infrastructure according to dependencies among resources provided by each computing device. The configuration management system provides a configurable manifest that represents the resources of each computing device of its respective computing infrastructure and includes dependency information associated with dependencies of resources on each computing device relative to the resources of other computing devices. The configuration management system uses this manifest to configure computing infrastructures so that these dependencies are resolved in a sequenced, consistent manner.

FIGS. 1A through 10 illustrate an example computing infrastructure management system 100 according to the teachings of the present disclosure. The system 100 includes a configuration management server 102 that communicates with one or more computing infrastructures 104 using corresponding configuration management proxies 106. Each computing infrastructure 104 includes multiple computing devices 108. The configuration management server 102 stores manifest files 110 that are unique to each implementation of computing infrastructure 104. As will be described in detail below, the system 100 transmits a manifest file 110 to a configuration management proxy 106 associated with the computing infrastructure 104, which is then translated by the proxy 106 into individual configuration directives according to one or more resource dependencies of each computing device.

Each computing infrastructure 104 may be any type having multiple computing devices 108 that perform together in a collaborative manner. The computing devices 108 may include, for example, data processing devices, data storage devices, servers, networking equipment, environmental control systems, and/or power management systems. In one aspect, each computing infrastructure 104 includes a combination of these devices that are packaged and interconnected in a standardized manner for ease of maintenance and use. Computing infrastructures such as these are often implemented in environments where relatively high reliability and/or availability are desired, such as in an enterprise environment. Nevertheless, it is contemplated that any computing infrastructure, such as a computer cluster, computing grid, blade array, and/or other computing infrastructure may be configured using the teachings of the present disclosure.

Each computing device 108 of its respective computing infrastructure 104 has one or more resources 128 (FIG. 1B) that are used to contribute to the overall functionality provided by its respective computing infrastructure 104. For example, a computing device 108 implemented as a packet switch (e.g., network router) may include hardware resources such as port interfaces, power systems, and processor systems that execute various software resources, such as packet forwarding algorithms, routing table configurations, and various security tools, such as firewalls, or other session enabled configuration systems. As another example, a computing device 108 implemented as a data processing system may include hardware resources, such as user interface devices, memory devices, and processor systems that execute software resources, such as user applications and various data processing algorithms to provide services to other computing devices in the computing infrastructure 104. As yet another example, a computing device 108 implemented as a data storage system may include hardware resources, such as a hard disk drive and/or memory interface units that stores data under the control of a processing system that executes one or more software resources, such as storage redundancy algorithms, and the like.

In many scenarios, certain resources 128 of each computing device 108 may have dependencies on other resources of the computing infrastructure 104. Generally speaking, a dependency 122 of a resource 128 is a characteristic in which provisioning of that resource depends upon the operation of another resource 128. For example, a resource 128 of one computing device may include a communication port configured as a dynamic host routing protocol (DHCP) client. This DHCP client, however, cannot be properly provisioned until its corresponding DHCP server is configured as a resource on another computing device 108. The configuration management system 100 provides a solution to this problem and others by identifying dependencies and generating configuration directives such that some, most, or all resources in the computing infrastructure are provisioned in a structured, orderly manner.

The management proxy 106 includes a processing system (FIG. 2) that executes a configuration management client 112 using a data source 114 stored in a computer-readable media (FIG. 2) (i.e., volatile or non-volatile memory). In the particular embodiment shown, the proxy 106 is a virtual machine (VM) that is launched when configuration of its associated computing infrastructure 104 is desired. The VM may be executed on a computing device 108 within its respective computing infrastructure 104, or executed on the server 102. In another embodiment, the features and operations of the configuration management client 112 are executed on a processor system and stored in the memory of either or both the server 102 and/or computing device 108 of its respective computing infrastructure 104. In other embodiments, the proxy 106 may include any type of computing system, such as one or more servers, personal computers, mobile computers and/or other mobile devices, and other computing devices. The proxy 106 may communicate with the server 102 and/or computing infrastructure 104 via wireless and/or wireline communications.

The server 102 has a configuration management master 116 that communicates with the proxy 106 to serve manifest files 110 to each proxy 106 for configuring its respective computing infrastructure 104. For example, the server 102 may respond to a request from a proxy 108 to transmit a manifest file 110. The server 102 includes a processing system 118 that executes the configuration management master 116 stored in a memory 120 (i.e., volatile and/or non-volatile memory). Examples of a server 102 include one or more servers, personal computers, mobile computers and/or other mobile devices, and other computing devices.

The configuration management master 116 maintains information about the resources of the computing devices 108 of the computing infrastructures 104 and stores this information in one or more manifest files 110. In one embodiment, one manifest file 110 may be stored and maintained for each computing infrastructure 104 managed by the system 100. In another embodiment, the system 100 may store and maintain a manifest file 110 for each of a group of related computing infrastructures 104 managed by the system 100. A manifest file 110 generally includes information for computing devices 108 and their resources 128 used by each computing infrastructure 104. The manifest file 110 includes multiple directives each associated with a resource that, when issued upon a subject computing infrastructure, instructs the computing infrastructure to provision that resource. Any suitable type of configuration management master 116 may be implemented with the teachings of the present disclosure. In one embodiment, the configuration management master 116 is a PUPPET MASTER™ management tool available from PUPPET LABS™, which is headquartered in Portland, Oreg.

In one aspect, the manifest file 110 for each computing infrastructure 104 may be generated manually and/or using a discovery process performed on the subject computing infrastructure 104. Additionally, the manifest file 110 may be modified on an as needed basis to tailor the operation of the resources used by its respective computing infrastructure 104 according to the needs of the computing infrastructure 104. For example, the manifest 110 for a particular computing infrastructure 104 may be modified on an ongoing basis to add, delete, or modify resources used by the computing infrastructure 104.

The server 102, proxies 106, and their associated computing infrastructures 104 communicate with one another in any suitable manner. For example, the server 102, proxies 106, and their associated computing infrastructures 104 communicate with each other using wireless and/or wireline communications. In one embodiment, the server 102, proxies 106, and their associated computing infrastructures 104 communicate with one another using a communication network, such as the Internet, an intranet, or another wired and/or wireless communication network. In one aspect, the server 102, proxies 106, and computing infrastructures 104 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the server 102, proxies 106, and computing infrastructures 104 may communicate with one another without the use of a separate and a distinct network. Additionally, other embodiments contemplate that the modules employed by the proxies 106, server 102, computing infrastructures 104 are integrated in one computing system.

Figure 1B:
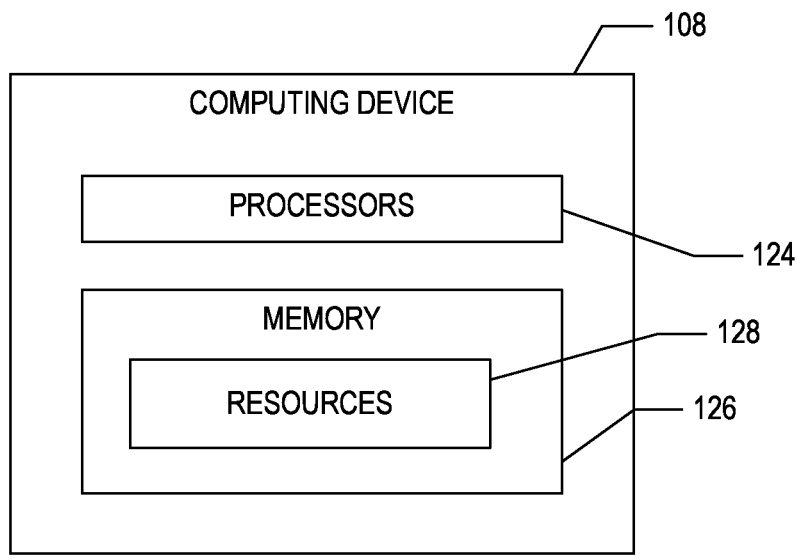
Figure 1C:
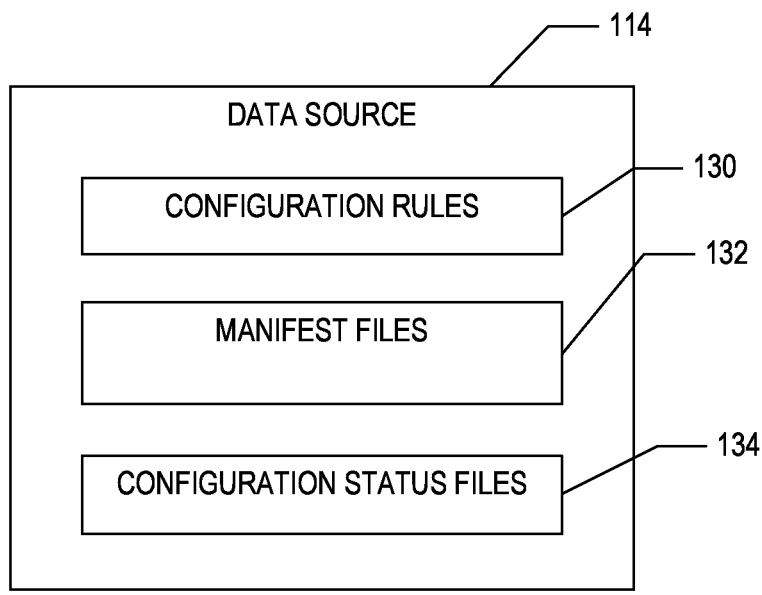

FIG. 1B depicts an example computing device 108 according to one aspect of the computing infrastructure management system 100. The computing device 108 is a computing or processing device that includes one or more processors 124 and memory 126. For example, the computing device 108 can be a personal computer, such as a laptop or notebook computer, a workstation, or other processing device such as a personal digital assistant or a tablet computer. In a particular embodiment, the computing device 108 is a rack mounted computing device, such as blade computing device in which multiple blade computing devices share a common backplane for communication with one another and for receiving power from a rack mounted power distribution unit. The computing device 108 also includes various resources 128 such as those described above with reference to FIG. 1A.

The data source 114 stores configuration rules 130 for managing dependencies among resources 128 of computing devices 108 used by the computing infrastructure 104, manifest files 132, and configuration status files 134 for storage of status information associated with the configuration of its respective computing infrastructure 104. Nevertheless, the data source 114 stores any suitable type of information for configuration of computing infrastructure 104 by the system. Although the data source 114 is shown as being located on, at, or within the management proxy 106, it is contemplated that the data source 114 can be located remotely from the management proxy 106, such as on, at, or within a memory 120 of the server 102, or a database managed by its respective computing infrastructure 104.

Figure 2:
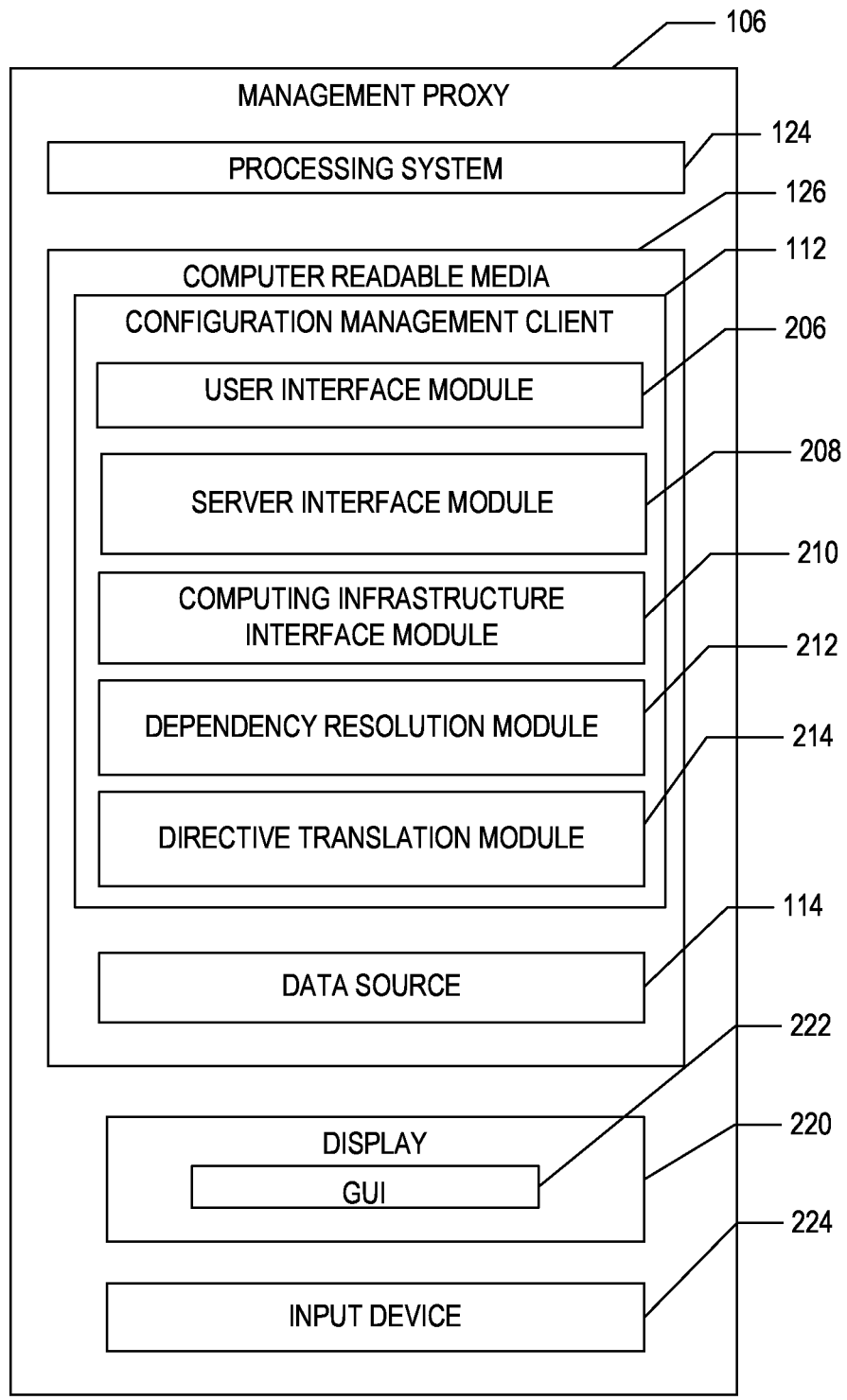

Referring now in more detail to FIG. 2, a block diagram of an example configuration management client 112 executed on the management proxy 106, is depicted according to one aspect of the present disclosure. The proxy 106 comprises a VM that is launched when configuration of its respective computing infrastructure 104 is desired. As shown, the proxy 106 is launched on a VM of one of the computing devices 108 of its respective computing infrastructure 104. In other embodiments, the proxy 106 is launched on a VM of the server 102, or on a computing device that is separate and distinct from any computing device managed by the respective computing infrastructure 104 and/or server 102. Additionally, although the configuration management client 112 as shown and described as being executed on a VM, it is contemplated that the configuration management client 112 may also be executed directly from a computing device 108 of the computing infrastructure 104 or executed directly from the server 102 without the use of a separate VM.

Generally, the configuration management client 112 receives a manifest file 110 from the server 102, resolves any dependencies of any resources 128 on each computing device 108 relative to resources of other computing devices 108, and issues directives to the target computing infrastructure 104 for its configuration according to information stored in the received manifest file 110. As mentioned previously, a dependency 122 of a resource 128 is a characteristic in which provisioning of that resource depends upon the operation of another resource 128. Thus, the configuration management client 112 identifies one or more dependencies for each resource and resolves these dependencies by translating the manifest file 110 to order directives for each resource according to their dependencies. The configuration management client 112 then uses the translated manifest file to provision the computing infrastructure 104 such that, for each resource having a dependency 122, other resources upon which the subject resource depends are provisioned prior to the subject resource being provisioned such that the resources are provisioned in a systematic, orderly manner.

The configuration management client 112 is stored in a memory 126 and executed on at least one processor 124 of a computing device 108. According to one aspect, the proxy 106 also includes a display 220, such as a computer monitor, for displaying data and/or a graphical user interface 222. The proxy 106 also includes an input device 224, such as a keyboard or a pointing device (e.g., a mouse, trackball, pen, or touch screen) to enter data into or interact with the graphical user interface (GUI) 222. According to one aspect, the configuration management client 112 includes instructions or modules that are executable by the processing system 202 as will be described in detail herein below.

The computer readable medium 126 includes volatile media, nonvolatile media, removable media, non-removable media, and/or another available medium. By way of example and not limitation, computer readable medium 126 comprises computer storage media and communication media. Computer storage media includes non-transient storage memory, volatile media, nonvolatile media, removable media, and/or non-removable media implemented in a method or technology for storage of information, such as computer readable instructions, data structures, program modules, or other data. Communication media embodies computer readable instructions, data structures, program modules, or other data and include an information delivery media or system.

A user interface module 206 facilitates the receipt of input data and/or output data from or to a user. In one example, the user interface module 206 displays status information indicating the current status of the subject computing infrastructure 104 before, during, or after configuration on the GUI 222. In another example, the user interface 206 may also display any unresolved dependencies to the user and prompt that the user input manual configuration information for resolving these unresolved dependencies using the input device 224. The user interface module 206 displays one or more selectable fields, editing screens, and the like for receiving the configuration information from the user.

A server interface module 208 communicates with the server 102 to receive a pertinent manifest file 110 from the server 102 for configuring the computing infrastructure 104. The server interface module 208 may also communicate with the server 102 to request a manifest file 110 and receive the requested manifest file 110 from the server 102 in response to the request. In one embodiment, access to the server 102 and/or manifest file 110 may be restricted to a login session for added security.

A computing infrastructure interface module 210 provides an interface to application program interfaces (APIs) of each computing device 108 of the computing infrastructure 104 for issuing directives that configures the resources of each computing device 108 in the computing infrastructure 104. For example, the computing infrastructure 104 may expose one or more APIs for each of its computing devices 108 that may be accessed by the computing infrastructure interface module 210 for transmitting configuration information to its respective computing device 108. The computing infrastructure interface module 310 also receives status information from the computing infrastructure 104 for monitoring various operational aspects, such as configuration status, unresolved dependencies, configuration errors, and the like.

A dependency resolution module 212 identifies dependencies in the received manifest file 110 and resolves the identified dependencies. The dependency resolution module 212 identifies the dependencies by receiving explicit dependency information stored in the manifest file 110 or by determining the dependencies according to implicit information stored in the manifest file 110. The dependency resolution module 212 uses explicit dependency information stored in the manifest file 110, such as grouped resources defining specific relationships among these resources. For example, the dependency resolution module 212 receives explicit dependency information from the manifest file 110 indicating that a first resource of one computing device 108 is grouped with, and depends on the configuration of a second resource of another computing device 108. Thus, the dependency resolution module 212 generates directives in which the second resource is to be configured prior to configuring the first resource such that the dependency 122 is resolved.

In one embodiment, the manifest includes directives having a structure in which resources that are dependent upon one another have directives formed into a group of directives including explicit dependency information that ensures one or more resources on which a subject resource depends are provisioned prior to the subject resource being provisioned. For example, a configuration management master, such as the PUPPET™ configuration management master may structure the manifest according to an object oriented model in which the group of directives is defined as a class of the model. The object oriented class has a structure that includes a subject resource to be provisioned along with explicit information associated with one or more other resources on which the subject resource depends. Additional details of such an object oriented class structure will be described in detail herein below.

The dependency resolution module 212 may also identify dependencies using implicit information included in the manifest file 110. For example, the manifest file 110 may include topology information indicating, among other things, certain resources, such as communication links, that are to be established between resources of the same or different computing devices 108 in which these links require configuration of a first resource prior to configuration of a second resource. In this case, the dependency resolution module 212 may, upon detection of such a communication link, determine that the first resource is to be configured prior to configuration of the second resource using one or more rules 130 associated with the type of communication link, and issue directives ensuring the dependencies of these resources are resolved.

As an example, the manifest file 110 includes information associated with a communication link to be established between two resources using a master/slave model in which a first resource is to be provisioned as a master node and a second resource is to be configured as a slave node. Upon identifying this information, the client 112 accesses the configuration rules 130 to determine that such a type of communication link requires provisioning of the master node prior to provisioning of the slave node. Thus, the client 112 translates the manifest file 110 such that the resource associated with the master node is provisioned first and the resource associated with the slave node is provisioned thereafter.

A directive translation module 214 translates configuration directives generated by the dependency resolution module 212 into a format suitable for use by the computing infrastructure 104. Using the computing infrastructure interface module 210, the directive translation module 214 transmits these translated directives to the computing infrastructure 104. For example, the PUPPET™ configuration management master provides a model-based user input for specifying components (e.g., resources) of the computing infrastructure 104. The directive translation module 214 converts these model-based components into explicit configuration directives that are formatted in a manner suitable for processing by the API of the computing infrastructure 104 for configuration of each of its resources. For another example, a computing infrastructure 104 may be configured to accept and process configuration directives formatted according to a first type of configuration management master, such as the PUPPET™ configuration management master. However, if the manifest file 110 is formatted according to a second type of configuration management master, the directive translation module 214 translates the configuration directives according to the second type of configuration management master such that the computing infrastructure 104 may properly read and process the directives generated by the client 112.

It should be appreciated that the modules described herein is provided only as examples, and that the client may have different modules, additional modules, or fewer modules than those described herein. For example, one or more modules as described in FIG. 2 may be combined into a single module. As another example, certain modules described herein may be encoded on, and executed on other computing systems, such as on the server 102, or one of the other computing devices 108 of the computing infrastructure 104.

Figure 3:
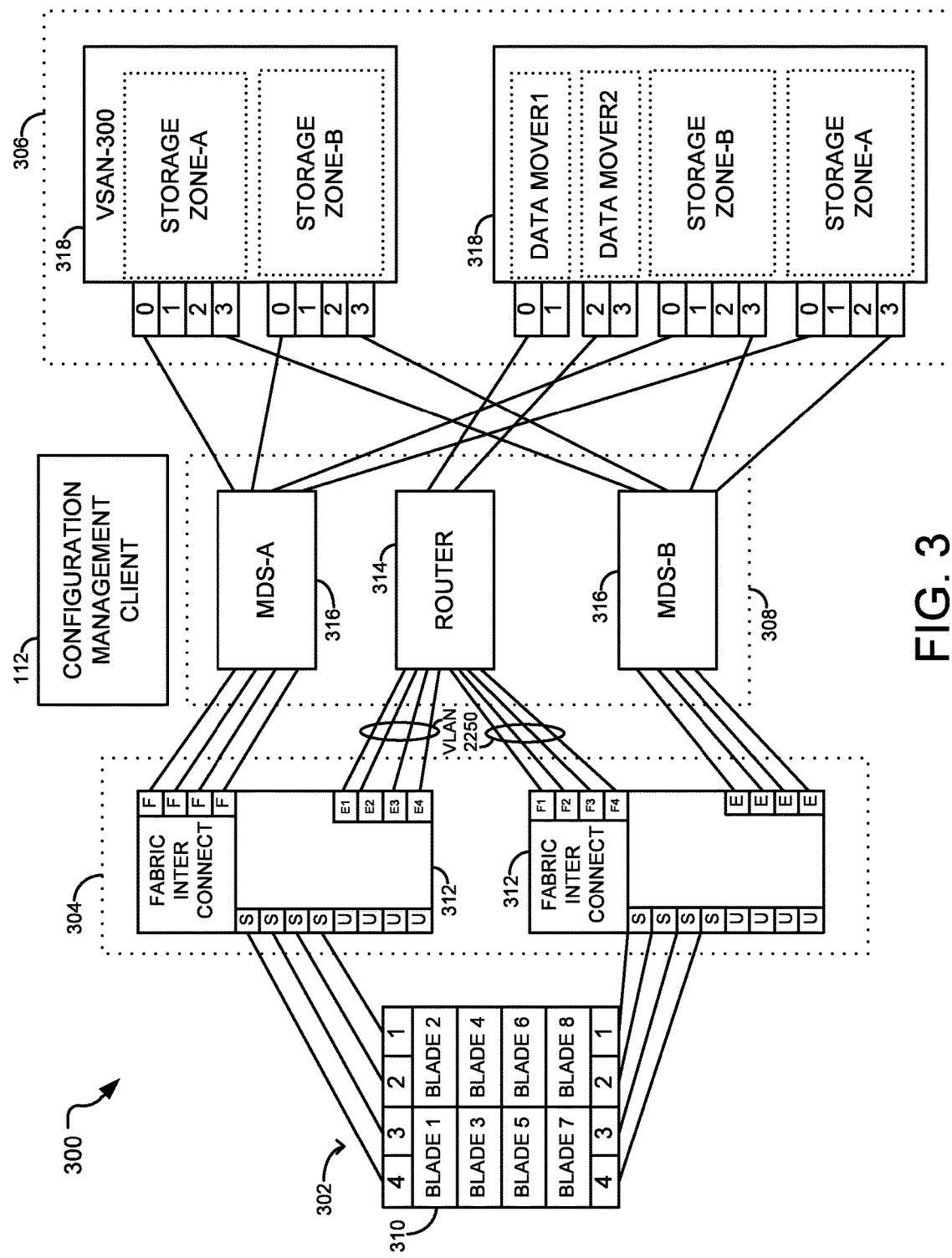

FIG. 3 illustrates an example computing infrastructure 300 according to the teachings of the present disclosure. The particular example computing infrastructure 300 as shown is a converged infrastructure package that is optimized for data storage utilizing various forms of redundancy for enhanced availability and reliability. For example, a computing infrastructure 300 such as that shown includes components includes components found in Vblock™ Systems available from VCE Company, LLC, which is headquartered in Richardson, Tex. Nevertheless, other embodiments of a computing infrastructure may include additional, fewer, or different components than shown herein without departing from the spirit and scope of the present disclosure.

The computing infrastructure 300 includes a user interface portion 302, a fabric interconnect portion 304, and a storage portion 306 that are interconnected via a routing portion 308. Each of these portions includes several computing devices. For example, the user interface portion 302 comprises a blade computing platform having multiple computing devices (e.g., blade servers) 310, the fabric interconnect portion 304 includes two fabric sections 312 that are redundant to one another, the routing portion 308 includes a network switch (e.g., packet router) 314 and multiple multilayer director switches (MDSs) 316, and the storage portion 306 includes multiple storage arrays 318. Each of these fabric sections, network switch, MDSs, and storage arrays comprise multiple computing devices that interact with one another in a collaborative fashion to perform the various features and operations of the computing infrastructure 300. Each of these fabric sections, network switch, MDSs, and storage arrays have one or more processors and executable instructions stored in volatile and/or non-volatile memory for performing the actions and/or steps described herein.

Nevertheless, configuration of certain computing devices forming the computing infrastructure 300 may have dependencies to other computing devices in the computing infrastructure 300. For example, before a virtual machine of one of the storage arrays 318 can be assigned a port group, the associated virtual local area network (VLAN) must be created on one or more of the network switches 314 and/or MDSs 316. The ordering is dependent on the network topology and specifically the number of fabric interconnect switches 312 that data is transmitted through to communicate with the user interface portion 302.

To manage dependencies such as these, the manifest file 110 includes implicit and/or explicit information to handle this behavior. In one embodiment, the domain specific language includes explicit directives for certain resources of computing devices to be configured prior to certain other resources being configured. The following example objection oriented class structure represents a portion of a manifest file 110 that includes explicit information for managing dependencies:

```
class Network {
    VLAN{ "2250":
        ensure->present,
        id->"2250",
        name->"cloud_management",
        target_device->["network router"]
            port_channels->["port-channel E1","port-channel F1"]
    }
}
```

When processed by the configuration management client 112, the class structure will be translated to:

| | |
|---|---|
| directive: vlan 2250, name cloud_management | // ensure VLAN 2250 named // cloud_management is provisioned |
| directive: interface port-channel E1 | // provision port-channel E1 |
| directive: switchport mode trunk | // provision mode of port-// channel E1 as a trunk |
| directive: switchport trunk allowed vlan 2250 | // activate port-channel E1 |
| directive: interface port-channel F1 | // provision port-channel F1 |
| directive: switchport mode trunk | // provision mode of port-// channel F1 as a trunk |
| directive: switchport trunk allowed vlan 2250 | // activate port-channel F1 |

As shown, the class structure is interpreted by the configuration management client 112 to generate directives "vlan 2250" and "name cloud_management" to ensure that the VLAN 2250 named "cloud_management" is active. The class structure is further interpreted by the configuration management client 112 to generate directives "interface port-channel E1", "switchport mode trunk", "switchport trunk allowed vlan 2250" to provision the resource "port-channel E1", and "interface port-channel F1", "switchport mode trunk", "switchport trunk allowed vlan 2250" to provision the resource "port-channel F1" after the VLAN 2250 named "cloud_management" has been provisioned. Thus, the explicit directive in the class structure ensures that a dependency 122 of port-channel E1 and port-channel F1 (e.g., VLAN service on the router 314) is activated prior to forming a connection with these channels.

In other embodiments, the manifest file 110 includes implicit directives for certain resources of computing devices to be configured prior to certain other resources being configured. For the example above in which port-channels E1 and F1 have a dependency 122 of a VLAN service of the network router 314, the manifest file 110 includes topology information associated with a VLAN connection to be configured between port-channels E1 and F1 of the user interface portion 302 with the network router 314. Using this topology information, the configuration management client 112 accesses the rules 130 stored in the data source 114, and determines from these rules that the VLAN service must be configured first, and subsequently generates directives to ensure this sequence of configuration.

As another example, the following class structure represents a portion of a manifest file 110 that includes explicit information for managing dependencies:

```
class Storage {
    VSAN { "VSAN-300":
        ensure->present,
        id->"300",
        name->"Zone-A",
        initiator->["server01_hba_a"]
        initiator_wwn->["20:00:00:25:30:22"]
            target_array->["emc-vnx-01"]
        target_wwn->["20:00:00:25:30:22"]
        target_device->["MADS-A","MDS-B"]
    }
}
```

When processed by the configuration management client 112, the manifest file 110 will be translated to:

```
configure:
    directive: zone name <Zone-A> vsan <VSAN-300>   // ensure VSAN-300
                                                    // is provisioned
    directive: mem pwwn <20:00:00:25:30:22>         // provision source
                                                    port
    directive: mem pwwn <20:00:00:25:30:22:01:0F>   // provision target
                                                    port
end
```

As shown, the class structure is interpreted by the configuration management client 112 to generate a nested set of configure directives including a sequence of instructions starting with one ensuring that the virtual storage area network (VSAN) named "VSAN-300" is true (i.e., VSAN-300 has been established). Next, the world wide name (WWN) ports of the source port "20:00:00:25:30:22" and target port "20:00:00:25:30:22:01:0F" are instantiated to form a connection to the VSAN-300.

Although the examples above describe example dependencies of establishing communication links prior to provisioning ports for these links, the configuration management client 112 manages other types of dependencies. For example, the blade servers 310 of the user interface portion 302 may be configured as a redundant array; but require that these blade servers 310 be individually configured before establishing the redundant array. Thus, the configuration management client 112 may identify this dependency 122 and generate directives to ensure that the individual blade servers 310 of the user interface portion 302 are individually configured before establishing a redundant array using these blade servers 310.

Figure 4:
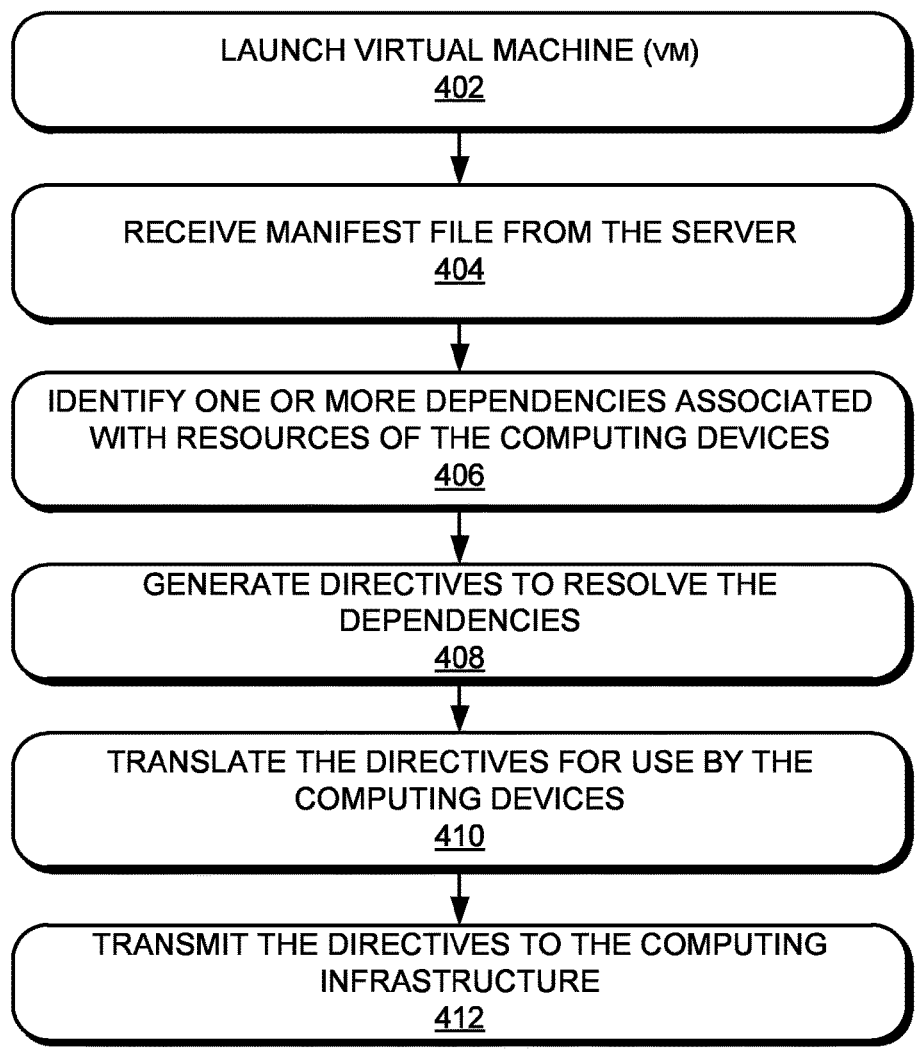

FIG. 4 illustrates an example process that is performed by the configuration management system 100 to manage configuration of one or more computing infrastructures 104 according to the teachings of the present disclosure.

In step 402, the system 100 launches a virtual machine (VM) and an associated configuration management client on the VM to form a proxy for the server 102. In one embodiment, the VM is launched by the server 102 in response to a request to configure the computing infrastructure 104. In another embodiment, the VM exists as a management interface for the computing infrastructure 104 such that the VM is launched as the computing infrastructure 104 is placed in service and remains active throughout operation of the computing infrastructure 104.

In step 404, the configuration management client 112 receives a manifest file 110 from the configuration management server 102. The manifest file 110 may be transmitted to the management proxy 106 in response to a request for the manifest file 110 by the proxy 106. Alternatively, the manifest file 110 may be pushed to the management proxy 106 autonomously as directed by the server 102.

In step 406, the configuration management client 112 identifies one or dependencies associated with resources 128 of the computing infrastructure 104. In one embodiment, the configuration management client 112 identifies dependencies using explicit dependency information stored in the manifest file 110. For example, the manifest file 110 may include explicit information indicating that one or more resources are dependent upon another resource of the computing infrastructure 104. In another embodiment, the configuration management client 112 identifies dependencies using implicit information stored in the manifest file 110 and, using one or more rules 130, identify these dependencies. For example, the manifest file 110 may include topology information indicating, among other things, a network connection between two resources in which one resource comprises a DHCP server and the second resource comprises a DHCP client. Using the rules 130, the configuration management client 112 implicitly determines that the DHCP client resource has a dependency 122 which is based upon the DHCP server resource. Once identified, the configuration management client 112 generates directives to resolve the identified dependencies in step 408.

In step 410, the configuration management client 112 translates the directives generated in step 408 into a format suitable for use by the computing infrastructure 104. For example, the configuration management client 112 may detect one or more APIs exposed by the computing infrastructure 104, identify a interfacing format of the exposed APIs, and translate the directives into a format suitable for use by the APIs. As another example, the configuration management client 112 translates directives into a format conforming to a specific type of configuration management master, such as the PUPPET™ configuration management master.

In step 412, the configuration management client 112 transmits the translated directives to the computing infrastructure 104 for configuring the computing infrastructure 104.

The steps described above may be repeated for additional configuration of the computing infrastructure 104, or for configuration of other computing infrastructures 104 in the system 100. Nevertheless, when configuration of computing infrastructures 104 is no longer needed or desired, the process ends.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 5:
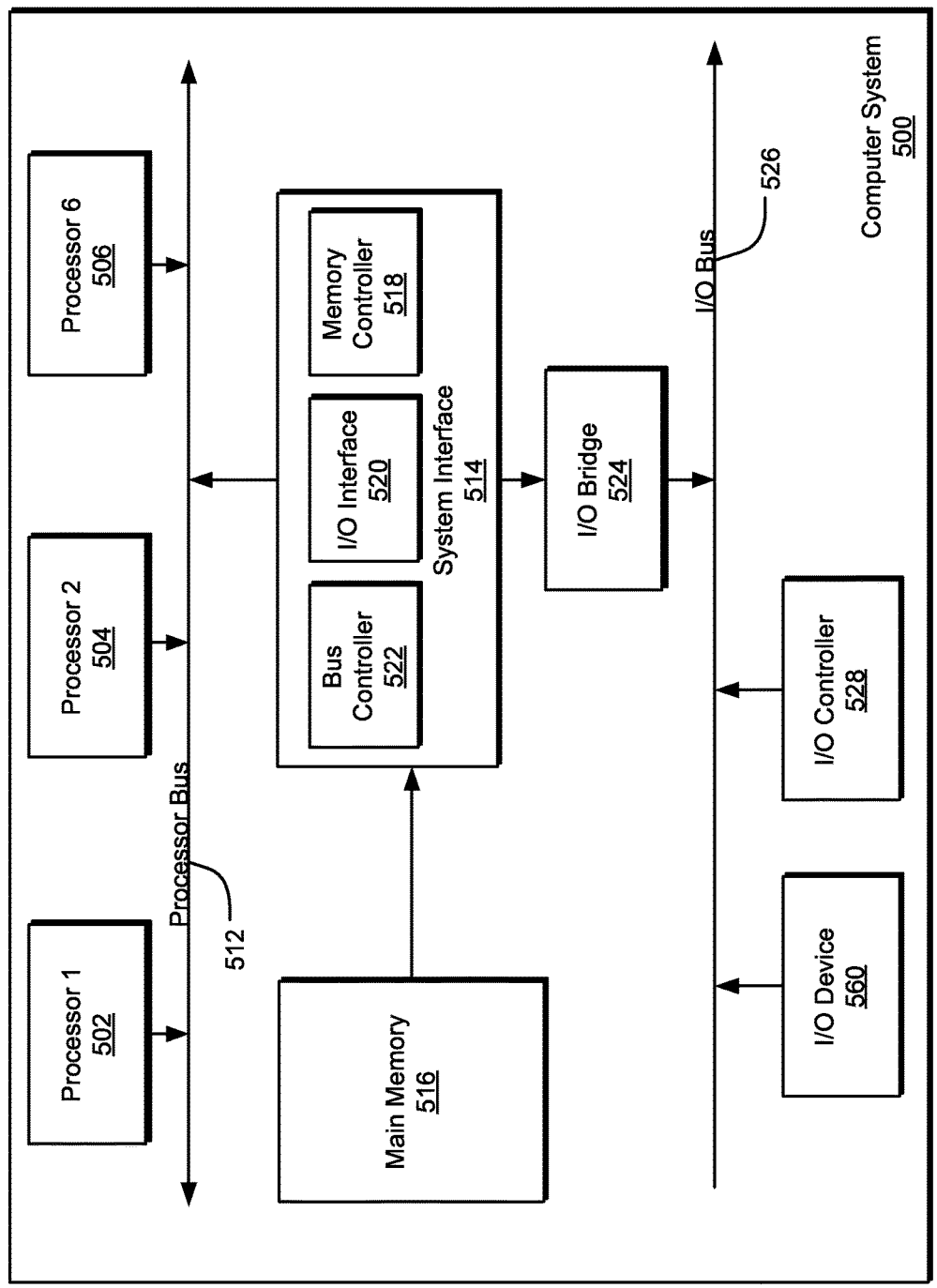

For example, FIG. 5 is a block diagram illustrating an example of a computing device or computer system 500 which may be used in implementing the embodiments of the present disclosure. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 513 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A computing infrastructure management system comprising:
   a configuration management device comprising at least one processor and at least one memory to store a configuration management client that is executed by the at least one processor to:
      receive a manifest file associated with a computing infrastructure comprising a plurality of computing devices each having one or more resources, wherein the manifest file includes one or more directives for provisioning the one or more resources of each of the plurality of computing devices, wherein the manifest file is structured according to an object oriented model including a class structure with information associated with a first resource that has a dependency to a second resource and the manifest file includes topology information comprising port information;
      identify a dependency from a communications link between a first resource and a second resource, the communications link indicated by the port information included in the topology information;
      translate the class structure of the manifest file into one or more ordered explicit directives including applying a rule for the communication link, the rule based on the identified dependency and specifying that the first resource be provisioned before the second resource, and a first explicit directive for provisioning the first resource ordered before a second explicit directive for provisioning the second resource, the ordering of the first explicit directive before the second explicit directive specifying that the first resource is provisioned before the second resource is provisioned; and
      provision the first resource and the second resource of each computing device using the one or more explicit directives, including at least the first explicit directive and the second explicit directive, in the translated manifest file.

2. The computing infrastructure management system of claim 1, wherein the configuration management client is executable to determine the dependency from one or more rules, including the rule for the communication link, stored in the memory, the one or more rules associating the dependency with a type of the dependency between the first resource and the second resource.

3. The computing infrastructure management system of claim 1, wherein the one or more directives are formed into a group of directives associated with the one or more resources, the group of directives comprising dependency information between each of the one or more resources of the group of directives.

4. The computing infrastructure management system of claim 3, wherein the group of directives define a class of the object oriented model.

5. The computing infrastructure management system of claim 1, wherein the configuration management device comprises a virtual machine (VM).

6. The computing infrastructure management system of claim 1, wherein the configuration management client comprises a plurality of clients that each receives the manifest file from a configuration management master executed on a server through a communication network, each client executed on one or more computing devices of its respective computing infrastructure.

7. A method comprising:
   receiving, using a configuration management client stored on a non-transitory medium and executed on at least one processor, a manifest file associated with a computing infrastructure comprising a plurality of computing devices each having one or more resources, wherein the manifest file includes one or more directives for provisioning the one or more resources of each of the plurality of computing devices, wherein the manifest file is structured according to an object oriented model including a class structure with information associated with a first resource that has a dependency to a second resource and the manifest file includes topology information comprising port information;
   identifying, using the configuration management client, a dependency from a communications link between a first resource and a second resource, the communications link indicated by the port information included in the topology information;

translating, using the configuration management client, the class structure of the manifest file into one or more ordered explicit directives including applying a rule for the communication link, the rule based on the identified dependency and specifying that the first resource be provisioned before the second resource, and a first explicit directive for provisioning the first resource ordered before a second explicit directive for provisioning the second resource, the ordering of the first explicit directive before the second explicit directive specifying that the first resource is provisioned before the second resource is provisioned; and provisioning, using the configuration management client, the first resource and the second resource of each computing device using the one or more explicit directives, including at least the first explicit directive and the second explicit directive, in the translated manifest file.

8. The method of claim 7, further comprising determining the dependency from one or more rules, including the rule for the communication link, stored in the non-transitory medium, the one or more rules associating the dependency with a type of the dependency between the first resource and the second resource.

9. The method of claim 7, further comprising determining the dependency using the one or more directives that are formed into a group of directives associated with the one or more resources, the group of directives comprising dependency information between each of the one or more resources of the group of directives.

10. The method of claim 9, wherein the group of directives define a class of the object oriented model.

11. The method of claim 7, further comprising receiving, by a plurality of clients, the manifest file from a configuration management master executed on a server through a communication network, each client executed on a computing device of its respective computing infrastructure.

12. A non-transitory computer-readable medium encoded with a configuration management client comprising modules executable by a processor comprising:

a server interface module to receive a manifest file associated with a computing infrastructure comprising a plurality of computing devices each having one or more resources, wherein the manifest file includes one or more directives for provisioning the one or more resources of each of the plurality of computing devices, wherein the manifest file is structured according to an object oriented model including a class structure with information associated with a first resource that has a dependency to a second resource and the manifest file includes a topology information comprising port information;

a dependency resolution module to:

identify a dependency from a communications link between a first resource and a second resource, the communications link indicated by the port information included in the topology information; and translate the class structure of the manifest file into one or more ordered explicit directives including applying a rule for the communication link, the rule based on the identified dependency and specifying that the first resource be provisioned before the second resource, and a first explicit directive for provisioning the first resource ordered before a second explicit directive for provisioning the second resource, the ordering of the first explicit directive before the second explicit directive specifying that the first resource is provisioned before the second resource is provisioned; and a computing infrastructure interface module to provision the first resource and the second resource of each computing device using the one or more explicit directives, including at least the first explicit directive and the second explicit directive, in the translated manifest file.

13. The non-transitory computer-readable medium of claim 12, wherein the dependency resolution module determines the dependency from one or more rules, including the rule for the communication link, stored in the non-transitory medium, the one or more rules associating the dependency with a type of the dependency between the first resource and the second resource.

14. The non-transitory computer-readable medium of claim 12, wherein the dependency resolution module determines the dependency using the one or more directives that are formed into a group of directives associated with the one or more resources, the group of directives comprising dependency information between each of the one or more resources of the group of directives.

15. The non-transitory computer-readable medium of claim 14, wherein the group of directives define a class of the object oriented model.

16. The non-transitory computer-readable medium of claim 12, wherein the configuration management client is executed on one or more computing devices of the computing infrastructure.

* * * * *